Patented Mar. 31, 1925.

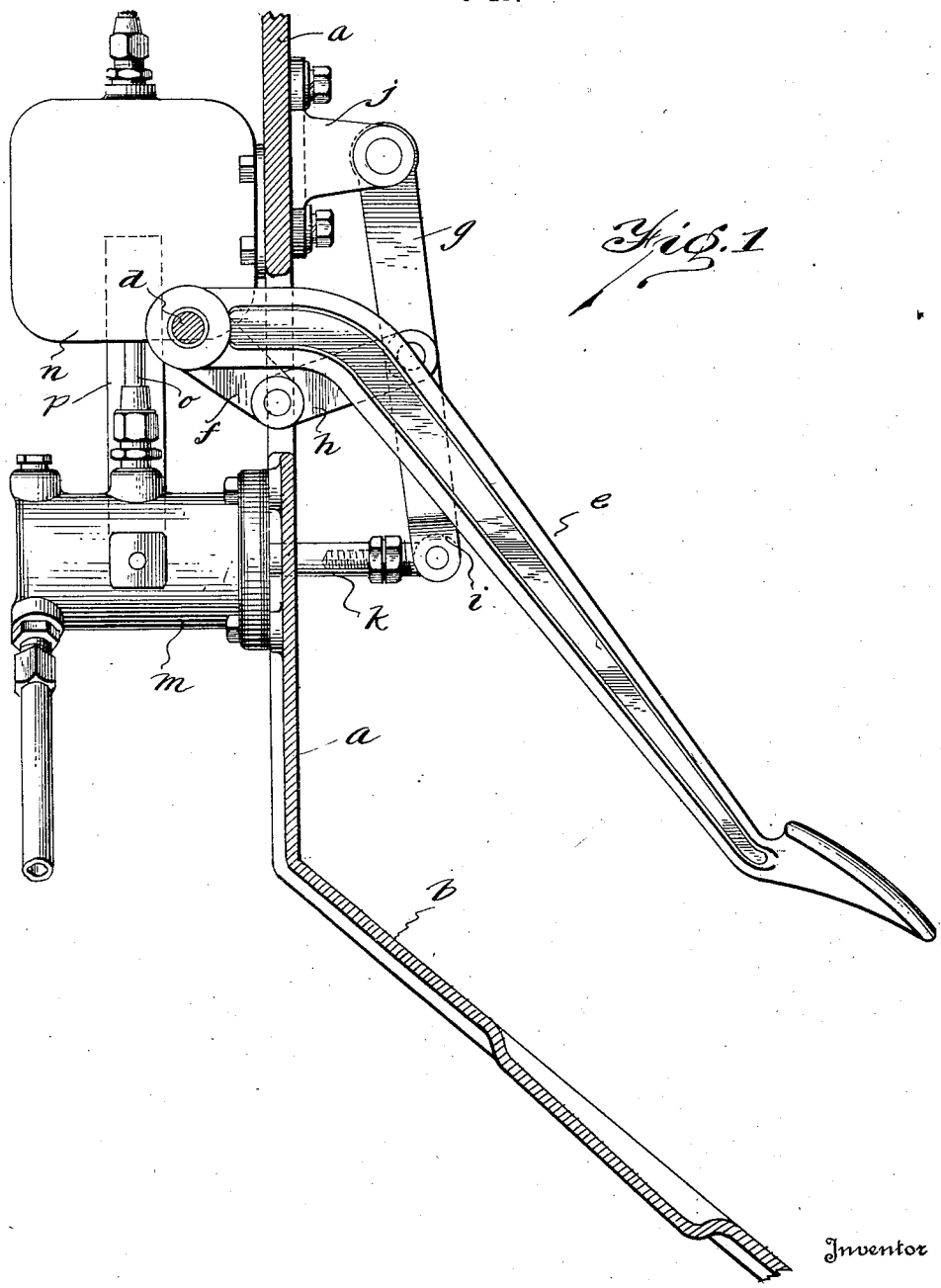

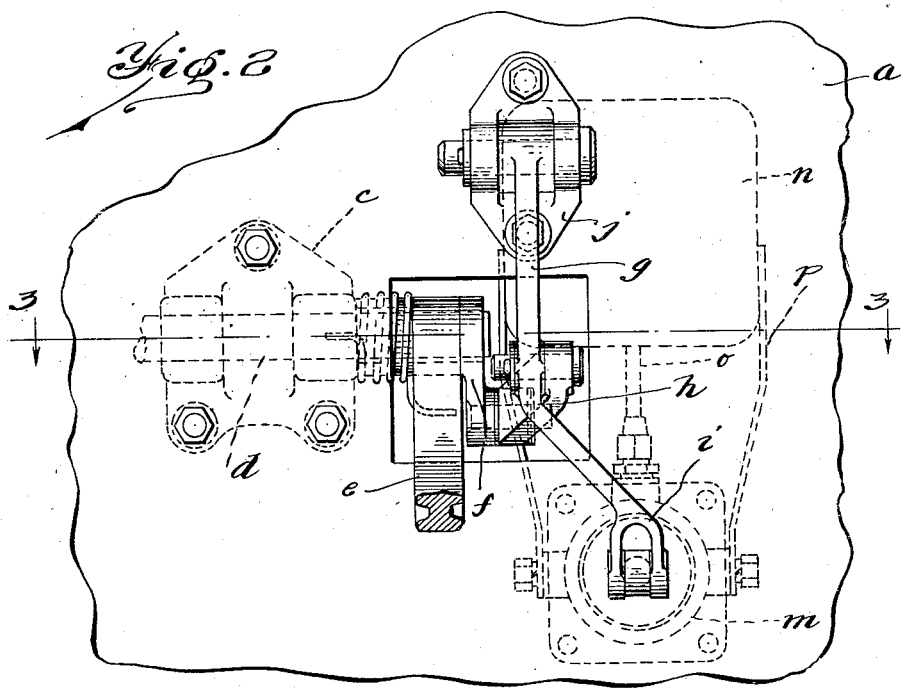
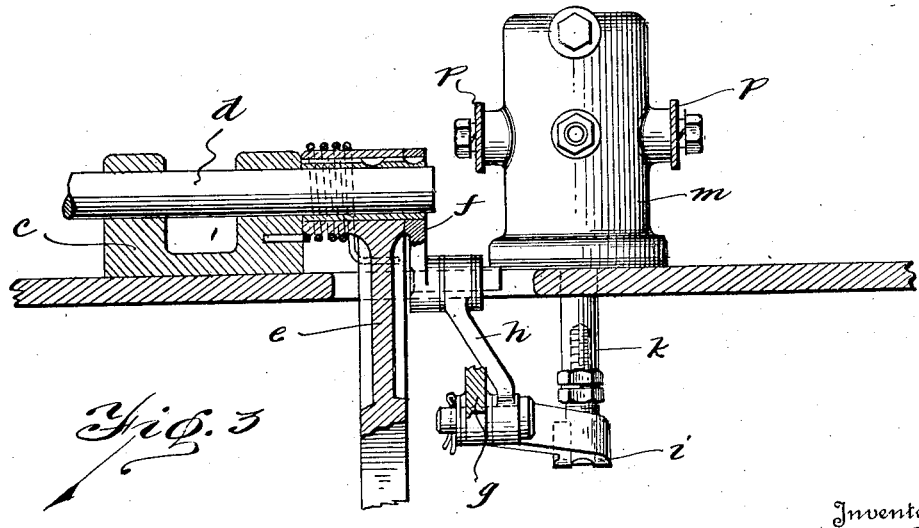

1,531,467

UNITED STATES PATENT OFFICE.

D'ORSAY McCALL WHITE, OF DETROIT, MICHIGAN.

MOTOR-CAR CONSTRUCTION.

Application filed May 18, 1923. Serial No. 639,801.

*To all whom it may concern:*

Be it known that D'ORSAY McCALL WHITE, a subject of Great Britain, residing at Detroit, in the county of Wayne and State of Michigan, has invented certain new and useful Improvements in Motor-Car Constructions, of which the following is a specification.

This invention relates to body and pedal construction for automobiles. It is almost the universal custom to have the brake or other operating pedal, protrude through slots in the floor board of the car. This has several objections, notably in the winter time when cold air is allowed to come up through the floor board and cause an objectionable draft. Furthermore, these slots in the floor board interfere with the use of carpet and require large holes in the carpet to be made and also require fitting and trouble in laying the carpet on the floor and taking it up again.

It is the object of the present invention to support the brake operating pedal from the dash. The brake operating pedal controls the brakes through a hydraulic power transmission system which is also hung on the dash.

The invention which is claimed in the appended claims relates not only to the hanging of the brake operating pedal from the dash, but includes also the fixtures for supporting the hydraulic transmission parts and the inter-connecting levers and links between the piston and the brake. This will more fully appear in the description following.

Fig. 1 is a fragmentary vertical section of a part of the dash and the floor board showing the pedal and the hydraulic transmission in place.

Fig. 2 is a fragmentary elevation taken from the right of Fig. 1.

Fig. 3 is a section on the line 3—3 of Fig. 2.

The dash of the car is designated $a$ and the floor board $b$. On the front of the dash is supported a bracket $c$ which rotatably supports the shaft $d$. A brake lever $e$ is fastened on to this shaft; on the end of the shaft $d$ a lever $f$ is fastened and is connected with an operating lever $g$ by means of the link $h$. This operating lever $g$ is pivotally supported in the bracket $j$ bolted to the rear of the dash. The lower end of this operating lever $g$ is off-set and also forked as at $i$ and is adapted to straddle the end of the piston rod $k$. This piston rod passes through the dash end into the hydraulic cylinder $m$.

Connected with the hydraulic cylinder is a reservoir $n$. This reservoir carries enough oil to replenish the transmission system with any oil that may be lost by leakage. The hydraulic cylinder $m$ is bolted to the front side of the dash and the reservoir $n$ is supported there-above by means of the connecting tube $o$ and the iron strips $p$.

No detailed description of the hydraulic transmission is necessary as no claim is made to the system per se as this in itself is old. However, it is believed to be new to support the oil reservoir and the hydraulic cylinder on the front of the dash and also it is new to support the brake operating pedal on the dash. Furthermore, the arrangement of levers and links, whereby the amount of travel imparted to the hydraulic piston is diminished from the amount of travel of the operating end of the foot lever of course increases the leverage and makes the operation easier.

What I claim is:

1. In motor car construction, the combination of a floor board, a dash supported at the front of the floor board, a depending foot lever having at its upper end a pivotal support well up on the dash and having its lower end extending downwardly at the rear of the dash to a position just above the floor board where it is provided with a pedal portion for engagement of the foot, and transmission devices connected with the upper end of the lever and located to the front of the dash for connection with a device or apparatus to be controlled by the lever.

2. In motor car construction, the combination of a dash, power transmission apparatus located on the front of the dash, a control foot lever hung from and pivotally supported on the dash and connected with the power transmission apparatus, and means supported on the front of the dash for suspending the foot lever and permitting it to pivot.

3. In motor car construction, the combination of a floor board, a dash supported at the front of the floor board, a depending foot lever having its upper end pivotally supported well up on the dash and having its lower end extending downwardly at the rear of the dash to a position just above the floor board where it is provided with a pedal portion for engagement with the foot, and a hydraulic transmission set supported upon the dash adjacent the pivotal point of the foot lever and connected with said foot lever to be controlled thereby.

4. In motor car construction, the combination of a dash, transmission devices supported on the front of the dash, a shaft rotatably supported on the front of the dash, an operating lever supported on the rear of the dash, a control foot lever passing through the dash and connected with said rotatably supported shaft, a lever on said shaft connected with the operating lever supported on the rear of the dash, and connections between the last mentioned lever and the transmission devices.

5. In motor car construction, the combination of a dash, a hydraulic cylinder supported on the dash, a shaft rotatably supported on the dash, an operating lever pivotally supported on the dash and operatively connected with the piston of the hydraulic cylinder, a foot lever attached to the shaft, and connections between the shaft and the operating lever for operatively connecting the foot lever with the piston.

6. In motor car construction, the combination of a dash, a fluid transmission system supported on the front of the dash including a cylinder with a piston, a shaft rotatably supported on the dash, an operating lever also pivoted on the dash and connected at its end with the piston, a foot lever connected with said shaft, and a lever fastened to said shaft and connected with an intermediate portion of the operating lever by means of a link.

In testimony whereof he has affixed his signature.

D'ORSAY McCALL WHITE.